US008310343B2

(12) United States Patent
Zhou et al.

(10) Patent No.: US 8,310,343 B2
(45) Date of Patent: Nov. 13, 2012

(54) BINARY TREE METHOD FOR MULTI-TAG ANTI-COLLISION (75) Inventors: Huan Zhou, Shenzhen (CN); Hongai Jiao, Shenzhen (CN); Jian Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 356 days.

(21) Appl. No.: 12/742,715

(22) PCT Filed: Jul. 11, 2008

(86) PCT No.: PCT/CN2008/071623
§ 371 (c)(1),
(2), (4) Date: May 13, 2010

(87) PCT Pub. No.: WO2009/065311
PCT Pub. Date: May 28, 2009

(65) Prior Publication Data
US 2010/0271185 A1 Oct. 28, 2010

(30) Foreign Application Priority Data

Nov. 20, 2007 (CN) .......................... 2007 1 0187353

(51) Int. Cl.
H04Q 5/22 (2006.01)
G08B 13/14 (2006.01)
H04W 4/00 (2009.01)
G06K 19/06 (2006.01)

(52) U.S. Cl. ...................... 340/10.2; 340/10.3; 340/10.4; 340/572.1; 370/314; 235/492; 235/451; 235/486

(58) Field of Classification Search .................. 340/10.2, 340/10.3, 10.4, 572.1; 235/492, 451, 486; 370/314
See application file for complete search history.

(56) References Cited

U.S. PATENT DOCUMENTS 6,307,848 B1 * 10/2001 Wood, Jr. ...................... 370/329
6,967,564 B2 * 11/2005 Hulvey ....................... 340/10.31
(Continued)

FOREIGN PATENT DOCUMENTS
CN        1980076 A      6/2007
(Continued)

OTHER PUBLICATIONS

RFID System Design and Research of the Anti-collision Algorithm.
(Continued)

*Primary Examiner* — Daniel Wu
*Assistant Examiner* — Mancil Littlejohn
(74) *Attorney, Agent, or Firm* — James W. Kayden (57) ABSTRACT A binary tree method for avoiding collision of multiple tags, comprising: during inventorying tags, a reader sending a re-splitting instruction to the tags and entering a next time slot for reception if the reader does not receive any reply information from the tags in a specified time slot and one of the following conditions is satisfied: the reader received incorrectly reply information from the tags in the former time slot, or a re-splitting instruction was sent in the former time slot; and when the tags receive the re-splitting instruction, for tags whose counter values are not 1, the counter values remaining unchanged, and tags whose counter values are 1 splitting into two subsets 0 and 1, and those counter-0 tags replying to the reader. With the present invention, the inventorying flow of Binary Tree is optimized, the inventorying efficiency is improved, and the whole flow becomes more reasonable.

8 Claims, 5 Drawing Sheets

U.S. PATENT DOCUMENTS

| | | | |
|---|---|---|---|
| 7,486,172 B2 * | 2/2009 | Martinez et al. | 340/10.2 |
| 7,626,503 B2 * | 12/2009 | Choi et al. | 340/572.1 |
| 8,036,329 B2 * | 10/2011 | Spindler et al. | 375/354 |
| 2006/0076401 A1 | 4/2006 | Frerking | |

FOREIGN PATENT DOCUMENTS

| | | |
|---|---|---|
| CN | 101069193 A | 11/2007 |
| CN | 101136053 A | 3/2008 |
| CN | 101145180 A | 3/2008 |
| JP | 2007-67791 A | 3/2007 |

OTHER PUBLICATIONS

International Standard. ISO/IEC 18000-6. Information technology—Radio frequency identification for item management—Part 6: Parameters for air interface communications at 860 MHz to 960 MHz. Aug. 15, 2004.

* cited by examiner

|  | ISO18000-6 |  |  |  |  |  | The method of the present invention |  |  |  |  |  |
|---|---|---|---|---|---|---|---|---|---|---|---|---|
| (1) | 0 | 0 | 0 | 0 | 0 |  | 0 | 0 | 0 | 0 | 0 | (1) |
| (2) | 0 | 0 | 0 | 1 | 1 |  | 0 | 0 | 0 | 1 | 1 | (2) |
| (3) | 0 | 1 | 1 | 2 | 2 |  | 0 | 1 | 1 | 2 | 2 | (3) |
| (4) |  | 0 | 0 | 1 | 1 |  |  | 0 | 0 | 1 | 1 | (4) |
| (5) |  | 1 | 1 | 2 | 2 |  |  | 1 | 1 | 2 | 2 | (5) |
| (6) |  |  | 0 | 1 | 1 |  |  | 0 | 1 | 2 | 2 | (6) |
| (7) |  |  | 0 | 1 | 2 | 2 |  |  | 0 | 1 | 1 | (7) |
| (8) |  |  |  | 0 | 1 | 1 |  |  |  | 0 | 0 | (8) |
| (9) |  |  |  |  | 0 | 0 |  |  |  | 0 | 1 | (9) |
| (10) |  |  |  |  | 0 | 1 |  |  |  |  | 0 | (10) |
| (11) |  |  |  |  |  | 0 |  |  |  |  |  |  |

BINARY TREE METHOD FOR MULTI-TAG ANTI-COLLISION

CROSS REFERENCE RELATED APPLICATIONS

This application is a national phase of PCT/CN2008/071623 filed Jul. 11, 2008, which claims priority to China Application Serial No. 200710187353.7, filed Nov. 20, 2007, both of which are entirely incorporated herein by reference.

TECHNICAL FIELD

The present invention relates to the wireless communication field, and more specifically, to a method for avoiding collision of multiple tags in Radio Frequency Identification (RFID).

BACKGROUND OF THE RELATED ART

In applications of the RFID technique, a reader generally corresponds to a plurality of electronic tags. The plurality of tags may collide with one another when accessing the reader simultaneously, and as a result, information of the tags cannot be sent to the reader correctly. Therefore, a mechanism is required to avoid collision or reduce collisions.

In the current international standard ISO 18000-6, algorithms of ALOHA and Binary Tree are adopted to solve the problem of collision.

The basic feature of the ALOHA is that the system divides a channel on which tags reply into several intervals based on time (the interval is referred to as time slot), and requires the tag to select one of the intervals to reply. In operation, a reader allocates a sending probability (or a range of selectable time slots) to each tag by an instruction, and then the tag makes a selection randomly and replies on time; if a collision occurs, the tag makes another selection and performs sending, or makes another selection or performs sending in following time slot, until all the tags access the reader.

Figure 1:
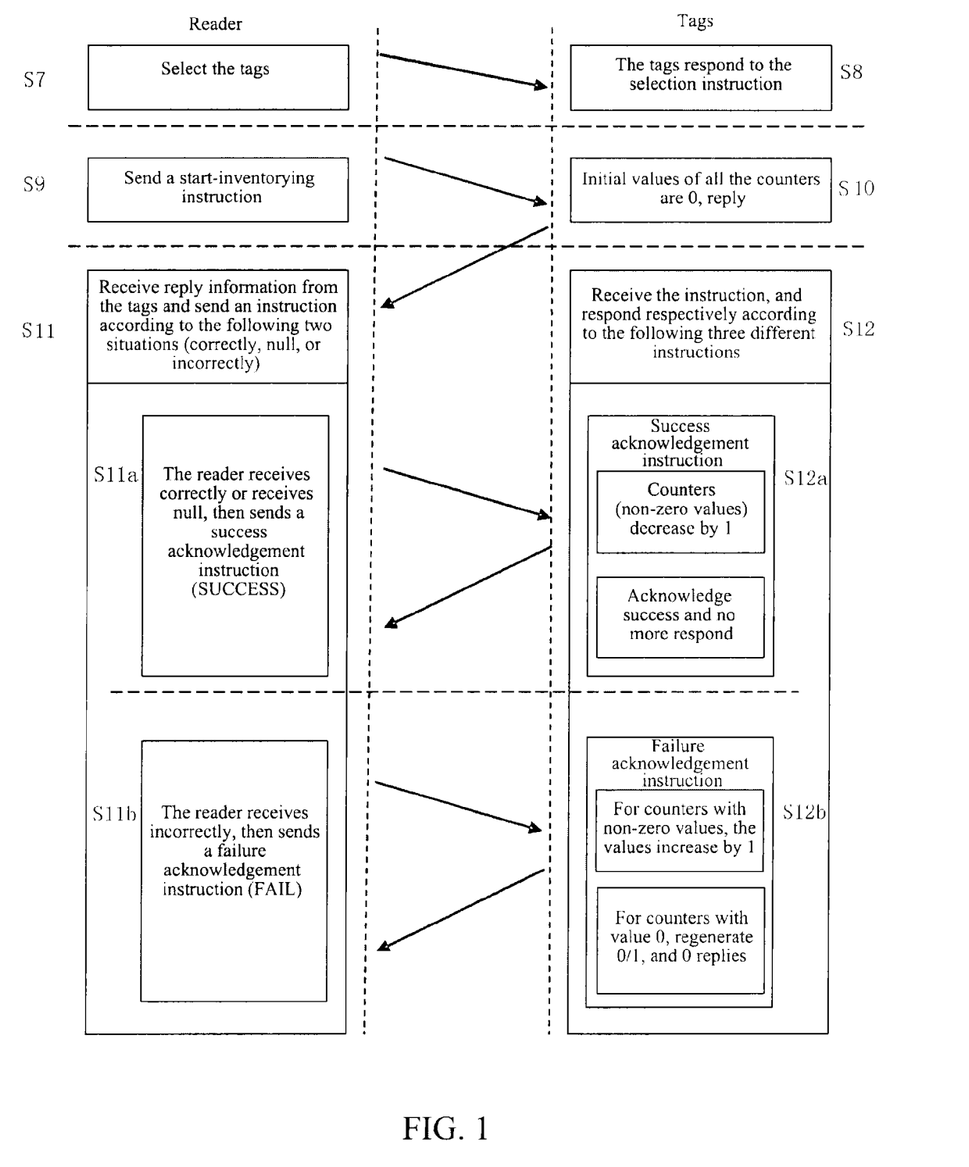
FIG. 1 is a flow chart of the interaction between a reader and tags during accessing of multiple tags according to the current ISO 18000-6.

The basic feature of the Binary Tree method is that each tag has a random number generator used to generate 0 or 1; and each tag has a counter and the tag replies when the value of the counter is 0. Operation of the method is shown in FIG. 1, in which a reader sends an instruction to make all the tags begin to reply, and after receiving the instruction, the tags have their random number generators generate 0 or 1 firstly, so that the tags going to reply are split into two subsets (according to random numbers 0 and 1); the tag with random number 0 replies immediately, and tag with random number 1 sets the counter value to 1; if there is no collision and the replying is successful, the reader sends an instruction for acknowledgement, and makes counter values of the other tags decrease by 1; if there is no information replied, the reader sends an instruction for acknowledgement, and counter values of all the tags decrease by 1, until the reader receives information replied by a tag; if tags collide, the reader sends an instruction to make the colliding tags generate random numbers and perform splitting, and counter values of the other tags increase by 1; and so forth, until all the tags reply successfully.

It can be seen from the above collision avoidance process that if tags collide in the first time slot, the reader has all the colliding tags generate random numbers; if no information is replied in the second time slot, it indicates that the random numbers generated for the colliding tags in the former time slot are all 1. The solution of 18000-6 TypeB is to make all the tags decrease by 1, and it is apparent that collision still happens in the third time slot as tags colliding in the first time slot are still the tags with random number 0 in the time slot; in the following fourth time slot, the reader sends an instruction to make all the colliding tags regenerate random numbers. Therefore, the acknowledgement instruction in the third time slot, which makes counter values of all the tags decrease by 1, causes a waste of one time slot in the inventory process.

SUMMARY OF THE INVENTION

The technical problem to be solved by the present invention is to provide a binary tree method for avoiding collision of multiple tags, which solves the problem of wasting time slots when inventorying multiple tags using Binary Tree in the prior art, and improves the efficiency of inventorying tags.

The technical scheme adopted in the present invention is: a binary tree method for avoiding collision of multiple tags, comprising:

during inventorying tags, a reader sending a re-splitting instruction to the tags and entering a next time slot for reception if the reader does not receive any reply information from the tags in a specified time slot and one of the following conditions is satisfied: the reader received incorrectly reply information from the tags in a former time slot, or a re-splitting instruction was sent in the former time slot; and when the tags receive the re-splitting instruction, for tags whose counter values are not 1, the counter values remaining unchanged, and tags whose counter values are 1 splitting into two subsets, counter values of tags in one of the subsets remaining unchanged, and counter values of tags in the other subset decreasing by 1, and then the tag whose counter value is 0 replying to the reader.

Moreover, the method may further comprise:

during inventorying the tags, the reader sending a success acknowledgement instruction to the tags and entering a next time slot for reception if the reader does not receive any reply information from the tags in a specified time slot and one of the following conditions is satisfied: the reader did not receive any reply information from the tags or received correctly reply information from the tags in a former time slot; and when the tags receive the success acknowledgement instruction, the tag replying information correctly leaving the inventorying process, and counter values of the tags replying information incorrectly decreasing by 1, and then the tag whose counter value is 0 replying to the reader.

Moreover, the method may further comprise:

during inventorying the tags, the reader sending a success acknowledgement instruction to the tags and entering a next time slot for reception if the reader receives reply information from the tags correctly in a specified time slot; and when the tags receive the success acknowledgement instruction, the tag replying information correctly leaving the inventorying process, and counter values of the tags replying information incorrectly decreasing by 1, and then the tag whose counter value is 0 replying to the reader.

Moreover, the method may further comprise:

during inventorying the tags, the reader sending a failure acknowledgement instruction to the tags and entering a next time slot for reception if the reader receives reply information from the tags incorrectly in a specified time slot; and when the tags receive the failure acknowledgement instruction, for tags whose counter values are not 0, the counter values increasing by 1; and tags whose counter values are 0 splitting into two subsets, counter values of tags in one of the subsets remaining unchanged, and counter values of tags in the other subset increasing by 1, and then the tag whose counter value is 0 replying to the reader.

Moreover, the method may further comprise:

when the tags split, activating a random number generator which generates 1 for tags in one of the subsets and generates 0 for tags in the other subset, counters values of tags for which 0 is generated decreasing by 1, and counter values of tags for which 1 is generated remaining unchanged.

Moreover, the method may further comprise:

when the tags split, activating a random number generator which generates 1 for tags in one of the subsets and generates 0 for tags in the other subset, counters values of tags for which 0 is generated remaining unchanged, and counter values of tags for which 1 is generated increasing by 1.

Moreover, the method may further comprise:

if the reader does not receive any reply information from the tags in a specified time slot and a re-splitting instruction was sent in a former time slot, and if the number of times the re-splitting instruction has been sent consecutively is recorded as N and N<n, then the reader sending the re-splitting instruction to the tags, otherwise, if N=n, the reader sending a success acknowledgement instruction to the tags and entering a next time slot for reception; n being a permitted number of times the re-splitting instruction can be sent consecutively, value of which is determined by a system or user.

Furthermore, the value of n is 2.

In summary, the present invention provides a binary tree method for avoiding collision of multiple tags, which optimizes the inventorying flow of Binary Tree, improves the efficiency of inventorying, saves the time of inventorying, and makes the whole flow more reasonable.

PREFERRED EMBODIMENTS OF THE INVENTION

The present invention provides a Binary Tree method for avoiding collision of multiple tags, comprising:

during inventorying tags, a reader sending a re-splitting instruction to the tags and entering the next time slot for reception if the reader does not receive reply information from the tags in a specified time slot and one of the following conditions is satisfied: the reader received reply information from the tags incorrectly in the former time slot, or a re-splitting instruction was sent in the former time slot; and when the tags receive the re-splitting instruction, for tags whose counter values are not 1, the counter values remaining unchanged, and tags whose counter values are 1 splitting into two subsets, counter values of the tags in one of the subset remaining unchanged, and counter values of the tags in the other subset decreasing by 1, and then the tag whose counter value is 0 replying to the reader, wherein one of the subsets formed by splitting may be an empty set.

The technical scheme of the present invention will be described in further detail below in conjunction with accompanying drawings and embodiments.

Figure 2:
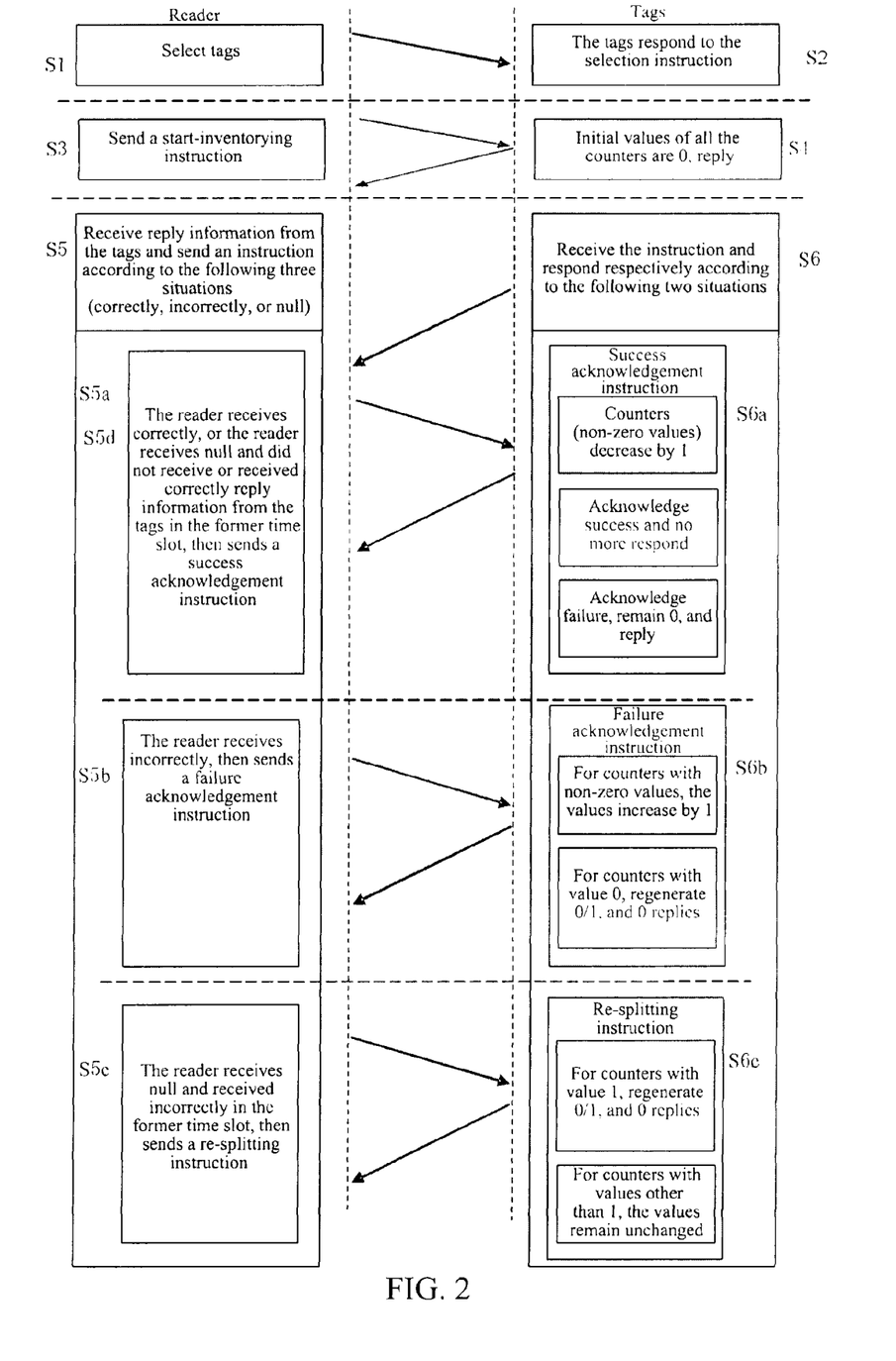
FIG. 2 is a flow chart of the interaction between a reader and tags during inventorying multiple tags according to Embodiment 1 of the present invention.

The process of avoiding collision of multiple tags in Radio Frequency Identification (RFID) using a method of the present invention is as follows, as shown in FIG. 2:

Steps S1, S2, and S3, a reader selects tags in an effective radio frequency field; the reader sends an instruction and begins to inventory the tags, and receives signals from the tags in a specified time slot;

wherein, the reader sends a selection instruction, and all the tags attempts to match a condition after receiving the selection instruction, and tags satisfying the condition entering the inventorying process.

Figure 3:
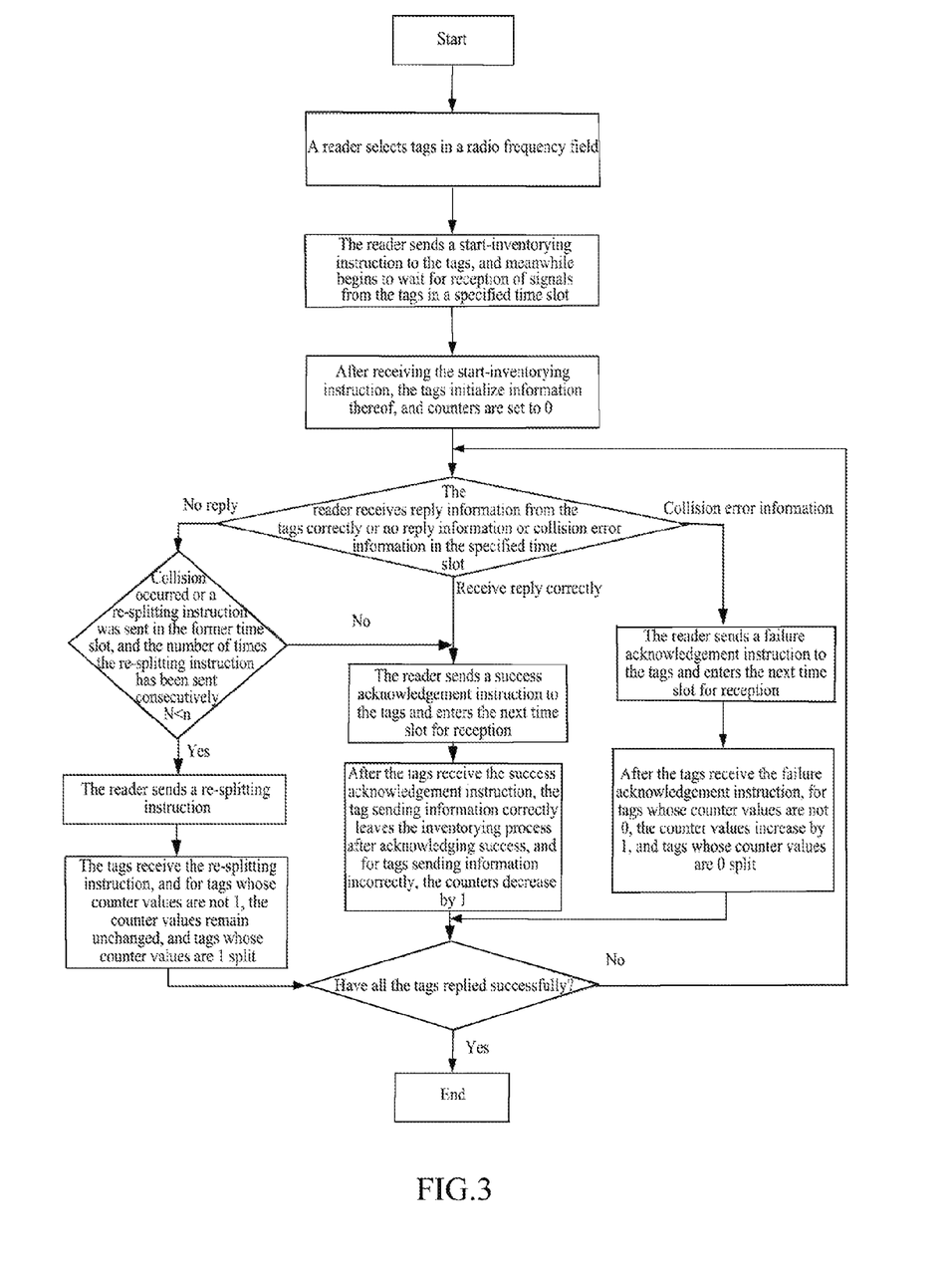
FIG. 3 is a flow chart of the interaction between a reader and tags during inventorying multiple tags according to Embodiment 2 of the present invention.

Step S4, after receiving the instruction for starting inventorying, the tags initialize information thereof, set counters to 0, and send tag information to the reader;

Step S5, the reader receives reply information from the tags, which divides into the following situations:

S5a, if the reader receives the reply information from the tags correctly in the specified time slot, the reader sends a success acknowledgement instruction to the tags, enters the next time slot for reception, and turns to step S6a;

S5b, if the reader receives the reply information from the tags incorrectly in the specified time slot, i.e., the tags collide when replying, the reader sends a failure acknowledgement instruction to the tags, enters the next time slot for reception, and turns to step S6b;

S5c, if the reader does not receive any reply information from the tags in the specified time slot, there are three optional embodiments, which are described respectively in the following:

first, if the reader does not receive any reply information from the tags in the specified time slot, and did not receive any reply information from the tags or receive reply information from the tags correctly in the former time slot, the reader sends a success acknowledgement instruction to the tags, and then turns to step S6a and enters the next time slot for reception;

second, if the reader does not receive any reply information from the tags in the specified time slot, and received incorrectly reply information from the tags or sent a re-splitting instruction in the former time slot, the reader sends a re-splitting instruction to the tags and then turns to step S6c and enters the next time slot for reception;

third, as shown in FIG. 3, if the reader does not receive any reply information from the tags in the specified time slot, and received incorrectly reply information from the tags or sent a re-splitting instruction (the number of times the re-splitting instruction has been sent consecutively N<n, and a permitted number n of times the re-splitting instruction can be sent consecutively may be determined by the system or a user) in the former time slot, the reader sends a re-splitting instruction to the tags and then turns to step S6c; otherwise, when N=n, the reader sends a success acknowledgement instruction and turns to step S6a, then enters the next time slot for reception;

preferably, n=2, and the reader can sends the re-splitting instruction consecutively for two times, In other words, if the reader still receives null in the next time slot after sending the re-splitting instruction consecutively for two times, the reader sends a success acknowledgement instruction to the tags to make counter values of all the tags in the system decrease by 1, and then enters the next time slot for reception and turns to step S6a.

Step S6a, when the tags receive the success acknowledgement instruction, the tag sending information correctly to the reader leaves the accessing process after acknowledging success, and no more respond to any instruction relating to accessing, and for the tags sending information incorrectly (i.e. tags whose counter values are not 0), the counter values decrease by 1, and turns to step S7;

Step S6b, when the tags receive the failure acknowledgement instruction, for tags whose counter values are not 0, the counter values increase by 1; tags whose counter values are 0 perform splitting, the random number generators are activated, all the tags with random number 1 generated make the counter values increase by 1, and for all the tags with random number 0 generated, the counter values remain unchanged (the counter values are 0), then turns to step S7;

Step S6c, when the tags receive the re-splitting instruction, for tags whose counter values are not 1, the counter values remain unchanged; tags whose counter values are 1 activate the random number generators; all the tags with random number 1 generated keep the counter values unchanged, and for all the tags with random number 0 generated, the counter values decrease by 1 (become 0) and tag information is replied immediately, then turns to step S7;

Step S7, the tag whose counter value is 0 reply information, and turns to step S4.

As shown in FIG. 1 and FIG. 2, compared with the method of ISO 18000-6, the main innovation of the present invention lies in:

1) in the steps S5c, S6c of the present invention, when receives null and received incorrect information in the former time slot, the reader sends a re-splitting instruction to the tags to make the tags whose counter values are 1 to re-split directly, so that one time of collision is avoided with the present invention; otherwise, the reader sends a success acknowledgement instruction to the tags to make counter values of all the tags decrease by 1. In contrast, in the method of ISO 18000-6, as shown by S11a, S12a in FIG. 1, when receives null and received incorrect information in the former time slot, the reader sends a success acknowledgement instruction to make counters of the tags whose counters are 1 decrease by 1, then the tags collide, and the reader receives incorrect information and continues to send a failure acknowledgement instruction to make colliding tags regenerate random numbers and re-split. It can be seen that it takes two time slots for the tags to generate random numbers and re-split in the method of traditional 18000-6; whereas, it takes only one time slot for the tags to re-split in the present invention. By eliminating one time slot of collision, the inventorying flow is optimized, the efficiency of inventorying is improved and the time of inventorying is shortened.

2) in the steps S5c, S6c of the present invention, when receives null and sent a re-splitting instruction in the former time slot, the reader sends a re-splitting instruction to the tags to make the tags whose counter values are 1 to re-split again. The re-splitting instruction may be sent consecutively, and the maximum number n of the times it can be sent consecutively may be determined by the system or a user. Preferably, the reader can send the re-splitting instruction consecutively for two times at most, and if the reader still receives null in the next time slot, then the reader sends a success acknowledgement instruction to the tags to make counter values of all the tags in the radio frequency field decrease by 1, and enters the next time slot for reception.

The method of the present invention will be illustrated with two examples of application below, and comparison with the method in ISO 18000-6 is made simultaneously.

Figure 4:
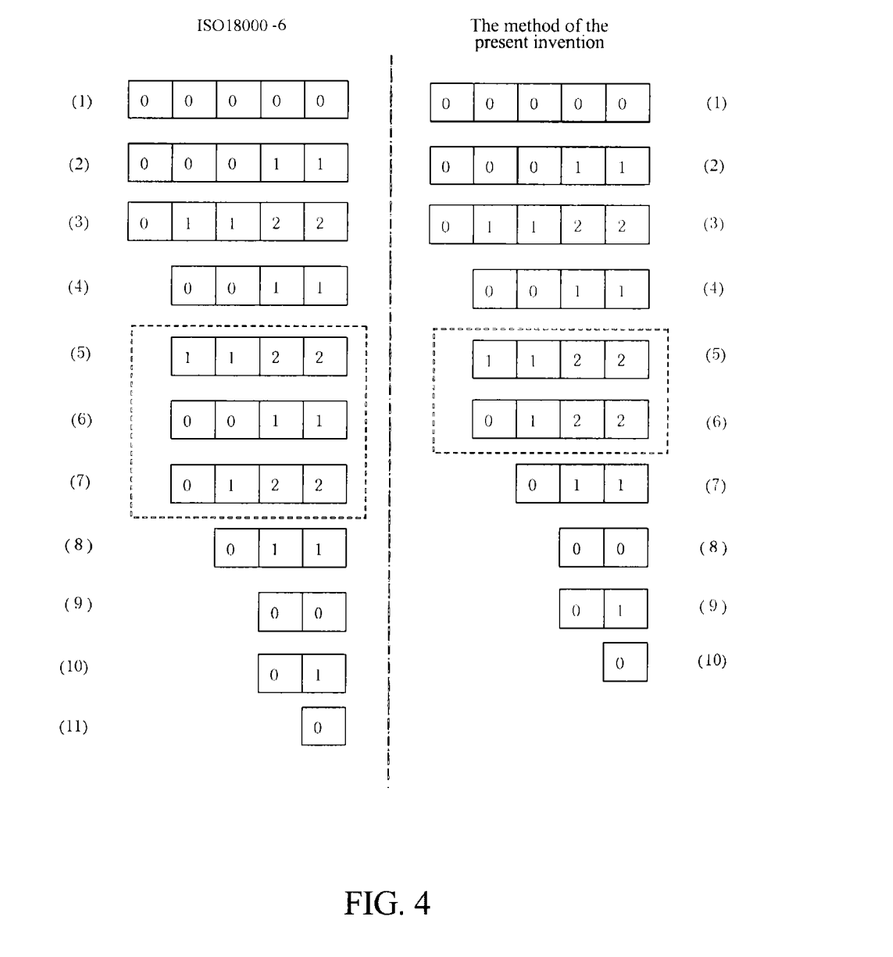
FIG. 4 is an illustration of comparison between ISO 18000-6 and Example 1 of application of the present invention.

FIG. 4 illustrates Example 1 of application of the present invention, showing a process of inventorying 5 tags, where the left half portion is the inventorying process of ISO 18000-6, and the right half portion is the inventorying process of the present invention. FIG. 4 is a schematic diagram of a first implementation of an embodiment of the present invention, in which a reader receives null in the current time slot and received incorrect information in the former time slot, then the reader sends a re-splitting instruction to the tags, and the tags split directly.

The inventorying process of ISO 18000-6 is described briefly as below:
 (1) time slot, initialization, counters of all the tags are 0;
 (2) time slot, 00011, 0 replies;
 (3) time slot, 01122, 0 replies successfully;
 (4) time slot, counters decrease by 1, become 0011;
 (5) time slot, collide, generate random numbers, become 1122;
 (6) time slot, no reply, counters decrease by 1, become 0011;
 (7) time slot, collide, generate random numbers, become 0122, 0 replies successfully;
 (8) time slot, counters decrease by 1, become 011;
 (9) time slot, 0 replies successfully, counters decrease by 1, become 00;
 (10) time slot, collide, generate random numbers, become 01, 0 replies successfully;
 (11) 0 replies successfully.

It takes 11 time slots to inventory 5 tags.

The inventorying process of the method of the present invention is described briefly as below:
 (1) time slot, initialization, counters of all the tags are 0;
 (2) time slot, 00011, 0 replies;
 (3) time slot, 01122, 0 replies successfully;
 (4) time slot, counters decrease by 1, become 0011;
 (5) time slot, collide, generate random numbers, become 1122;
 (6) time slot, no reply, re-split, become 0122, 0 replies successfully;
 (7) time slot, counters decrease by 1, become 011;
 (8) time slot, 0 replies successfully, counters decrease by 1, become 00;
 (9) time slot, collide, generate random numbers, become 01, 0 replies successfully;
 (10) 0 replies successfully.

It takes 10 time slots to inventory 5 tags.

Figure 5:
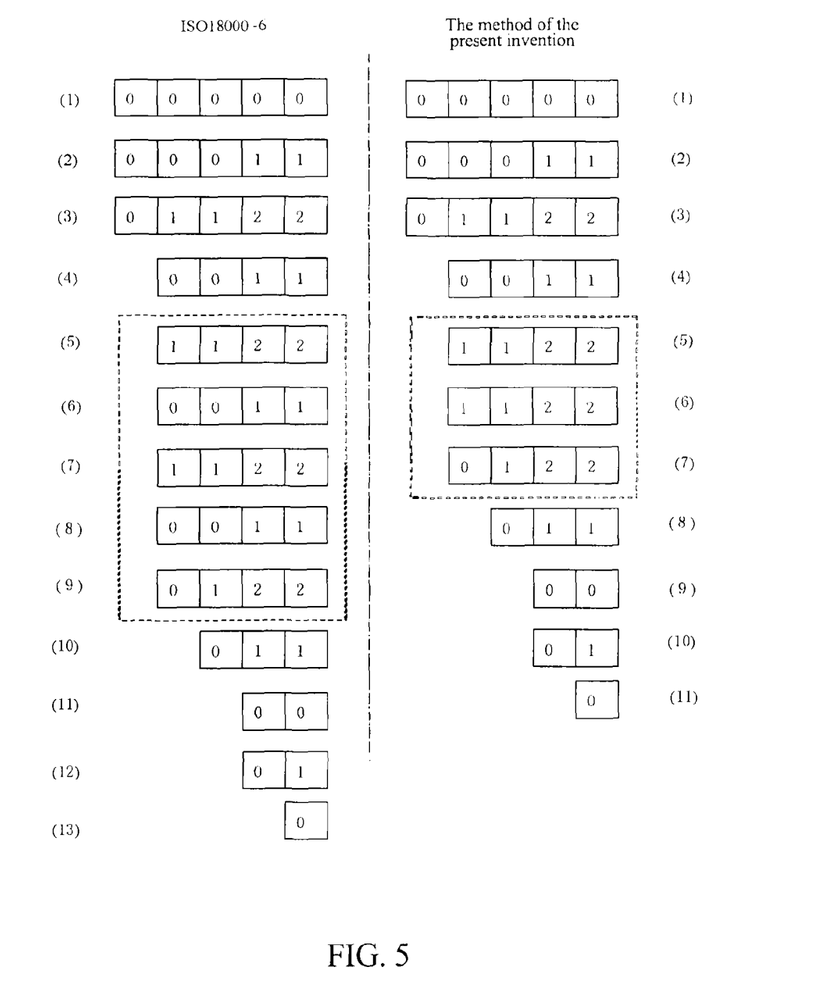
FIG. 5 is an illustration of comparison between ISO 18000-6 and Example 2 of application of the present invention.

FIG. 5 illustrates Example 2 of application of the present invention, showing a process of inventorying 5 tags, where the left half portion is the inventory process of ISO 18000-6, and the right half portion is the inventory process of the present invention. FIG. 5 is a schematic diagram of a second implementation of an embodiment of the present invention, in which a reader receives null in the current time slot and received incorrect information or sent a re-splitting instruction in the former time slot, then the reader sends a re-splitting instruction to the tags, and the tags split directly.

The inventorying process of ISO 18000-6 is described briefly as below:
 (1) time slot, initialization, counters of all the tags are 0;
 (2) time slot, 00011, 0 replies;
 (3) time slot, 01122, 0 replies successfully;
 (4) time slot, counters decrease by 1, become 0011;
 (5) time slot, collide, generate random numbers, become 1122;
 (6) time slot, no reply, counters decrease by 1, become 0011;

(7) time slot, collide, generate random numbers, become 1122;

(8) time slot, no reply, counters decrease by 1, become 0011;

(9) time slot, collide, generate random numbers, become 0122, 0 replies successfully;

(10) time slot, counters decrease by 1, become 011;

(11) time slot, 0 replies successfully, counters decrease by 1, become 00;

(12) time slot, collide, generate random numbers, become 01, 0 replies successfully;

(13) 0 replies successfully.

It takes 13 time slot to inventory 5 tags.

The inventorying process of the method of the present invention is described briefly as below:

(1) time slot, initialization, counters of all the tags are 0;

(2) time slot, 00011, 0 replies;

(3) time slot, 01122, 0 replies successfully;

(4) time slot, counters decrease by 1, become 0011;

(5) time slot, collide, generate random numbers, become 1122;

(6) time slot, no reply, re-split, become 1122;

(7) time slot, no reply, re-split, become 0122, 0 replies successfully;

(8) time slot, counters decrease by 1, become 011;

(9) time slot, 0 replies successfully, counters decrease by 1, become 00;

(10) time slot, collide, generate random numbers, become 01, 0 replies successfully;

(11) 0 replies successfully.

It takes 11 time slots to inventory 5 tags.

As can be seen for the figures:

1) for inventorying 5 tags, in the first case (as shown in FIG. 4), 11 time slots are taken to complete it in the method of ISO 18000-6, while 10 time slots are taken to complete it in the method of the present invention; in the second case (as shown in FIG. 5), 13 time slots are taken to complete it in the method of ISO 18000-6, while 11 time slots are taken to complete it in the method of the present invention; the method of present invention is superior to the current binary collision avoidance solution in both cases.

2) when null is received and the reception in the former time slot was incorrect, namely after the time slot (5) in the method of ISO 18000-6 shown in the left half portion of FIG. 4, firstly, counters are made decrease by 1 by a SUCCESS instruction, resulting in the state of time slot (6), and then tag information is sent and collision occurs, resulting in the state of time slot (7); whereas, with the improvement of the present invention, a re-splitting instruction is sent, resulting in (5) proceeding to (7) directly, namely the (5) and (6) in the right half portion of FIG. 4, so that one time slot is saved.

3) when receives null and sent a re-splitting instruction in the former time slot, the reader sends a re-splitting instruction again. After the time slot (5) in the method of ISO 18000-6 shown in the left half portion of FIG. 5, firstly, the counters are made decrease by 1 by a SUCCESS instruction, resulting in the state of time slot (6), then collision occurs, resulting in the state of time slot (7), then there is no reply and the counters decrease by 1, resulting in the state of time slot (8), and then collision occurs and random numbers are generated subsequently, resulting in the state of time slot (9), and then tag information is replied successfully; in contrast, with the improvement of the present invention, the re-splitting instruction is sent for two times, resulting in (5) proceeding to (9) directly, namely the (5), (6) and (7) in the right half portion of FIG. 5, so that two time slots are saved.

The present invention is an effective improvement of Binary Tree. With the collision avoidance method of the present invention, the number of the times of replying by the tags can be reduced, and efficiency of the accessing by the multiple tags can be improved. Besides, the operation is simple, and reliability of the accessing by the tags is increased as well.

Of course, the present invention may have many other embodiments. A person skilled in the art may make various corresponding alternations and modifications according to the present invention, without departing from the spirit and essence of the present invention, and such corresponding alternations and modifications shall all belong to the protection scope of the appended claims of the present invention.

INDUSTRIAL APPLICABILITY

The method for avoiding collision of multiple tags in Radio Frequency Identification provided by the present invention optimizes the inventorying flow of Binary Tree, improves the efficiency of inventorying, saves the time of inventorying, and makes the whole flow more reasonable.

What is claimed is:

1. A binary tree method for avoiding collision of multiple tags, comprising:
during inventorying tags, a reader sending a re-splitting instruction to the tags and entering a next time slot for reception if the reader does not receive any reply information from the tags in a specified time slot and one of the following conditions is satisfied: the reader received incorrectly reply information from the tags in a former time slot, or a re-splitting instruction was sent in the former time slot; and
when the tags receive the re-splitting instruction, for tags whose counter values are not 1, the counter values remaining unchanged, and tags whose counter values are 1 splitting into two subsets, counter values of tags in one of the subsets remaining unchanged, and counter values of tags in the other subset decreasing by 1, and then the tag whose counter value is 0 replying to the reader.

2. The method of claim 1, further comprising:
during inventorying the tags, the reader sending a success acknowledgement instruction to the tags and entering a next time slot for reception if the reader does not receive any reply information from the tags in a specified time slot and one of the following conditions is satisfied: the reader did not receive any reply information from the tags or received correctly reply information from the tags in a former time slot; and
when the tags receive the success acknowledgement instruction, the tag replying information correctly leaving the inventorying process, and counter values of the tags replying information incorrectly decreasing by 1, and then the tag whose counter value is 0 replying to the reader.

3. The method of claim 1, further comprising:
during inventorying the tags, the reader sending a success acknowledgement instruction to the tags and entering a next time slot for reception if the reader receives reply information from the tags correctly in a specified time slot; and
when the tags receive the success acknowledgement instruction, the tag replying information correctly leaving the inventorying process, and counter values of the tags replying information incorrectly decreasing by 1, and then the tag whose counter value is 0 replying to the reader.

4. The method of claim 1, further comprising:

during inventorying the tags, the reader sending a failure acknowledgement instruction to the tags and entering a next time slot for reception if the reader receives reply information from the tags incorrectly in a specified time slot; and when the tags receive the failure acknowledgement instruction, for tags whose counter values are not 0, the counter values increasing by 1; and tags whose counter values are 0 splitting into two subsets, counter values of tags in one of the subsets remaining unchanged, and counter values of tags in the other subset increasing by 1, and then the tag whose counter value is 0 replying to the reader.

5. The method of claim 1, further comprising:

when the tags split, activating a random number generator which generates 1 for tags in one of the subsets and generates 0 for tags in the other subset, counters values of tags for which 0 is generated decreasing by 1, and counter values of tags for which 1 is generated remaining unchanged.

6. The method of claim 4, further comprising:

when the tags split, activating a random number generator which generates 1 for tags in one of the subsets and generates 0 for tags in the other subset, counters values of tags for which 0 is generated remaining unchanged, and counter values of tags for which 1 is generated increasing by 1.

7. The method of claim 3, further comprising:

if the reader does not receive any reply information from the tags in a specified time slot and a re-splitting instruction was sent in a former time slot, and if the number of times the re-splitting instruction has been sent consecutively is recorded as N and N<n, then the reader sending the re-splitting instruction to the tags, otherwise, if N=n, the reader sending a success acknowledgement instruction to the tags and entering a next time slot for reception; n being a permitted number of times the re-splitting instruction can be sent consecutively, value of which is determined by a system or user.

8. The method of claim 7, wherein the value of n is 2.

\* \* \* \* \*